Patented Jan. 23, 1951

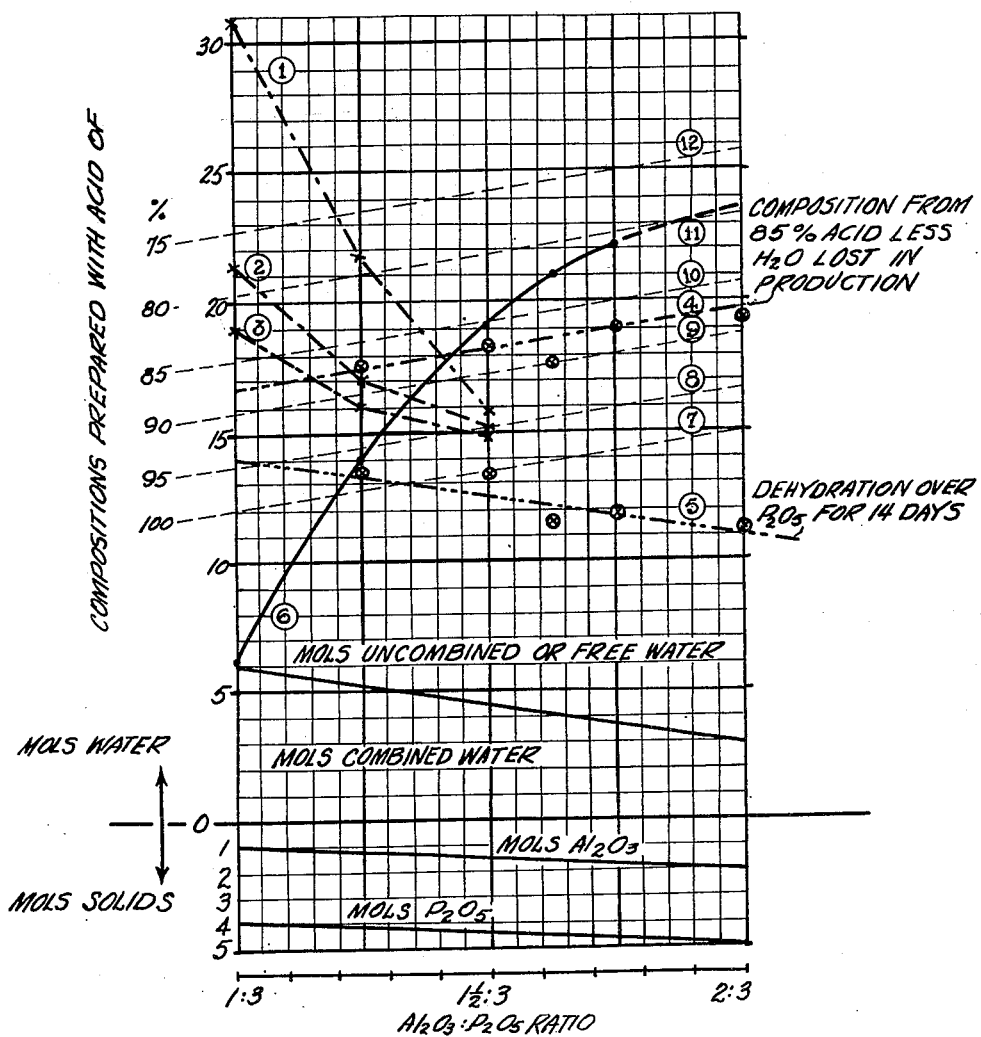

2,538,867

UNITED STATES PATENT OFFICE 2,538,867

SOLID ALUMINUM HYDROGEN PHOSPHATES

Herbert H. Greger, Rockville, Md.

Application October 29, 1948, Serial No. 57,355

4 Claims. (Cl. 23—105)

This application is a continuation-in-part of my co-pending application, Serial No. 490,495, filed June 11, 1943, now forfeited.

This invention relates to aluminum hydrogen phosphates and more specifically to an amorphous, glassy, water dispersible aluminum hydrogen phosphate having glue-like adhesive and thermoplastic properties, and solid at room temperature.

The adhesive properties of solutions of aluminum hydrogen phosphates having $Al_2O_3$ to $P_2O_5$ compositions ranging from 1:3 to 2:3 have been known and such solutions can be fairly easily prepared. When, however, attempts have been made to prepare solid aluminum hydrogen phosphates within the above range, it has been found that difficulties are encountered principally in the loss of the most desirable properties of the compounds such as high dispersibility in water and adhesiveness. These undesirable results are apparently due to devitrification or formation of the solid compounds in various stages of crystallization. It appears that the free or uncombined water content of the solid aluminum hydrogen phosphates must be maintained above a predetermined value to avoid loss of its water dispersible property.

The principal object of this invention is to provide aluminum hydrogen phosphates having an $Al_2O_3$ to $P_2O_5$ ratio ranging from 1.5:3 to 1.85:3 in the form of an amorphous solid at room temperatures and below, which are dispersible in water to produce clear viscous solutions with highly adhesive properties.

Another object of this invention is to provide aluminum hydrogen phosphates having an $Al_2O_3$ to $P_2O_5$ ratio ranging from 1.5:3 to 1.85:3, in the form of an amorphous solid at room temperatures and below, which are dispersible in water to produce clear viscous solutions with highly adhesive properties, and in which the free or uncombined water content is controlled to maintain its water dispersible and adhesive properties.

A further object of this invention is to provide methods of preparing aluminum hydrogen phosphates having an $Al_2O_3$ to $P_2O_5$ ratio ranging from 1.5:3 to 1.85:3 in the form of an amorphous solid at room temperatures and below, which are dispersible in water to produce clear viscous solutions with highly adhesive properties.

To facilitate the understanding of the present invention, reference is made to the accompanying drawings.

In the drawings, the single figure is a chart showing the physical state of aluminum hydrogen phosphates in relation to the water content and composition ratio of $Al_2O_3$ to $P_2O_5$.

Aluminum hydrogen phosphates having the properties of amorphous, glassy, water dispersible solids can be produced in the composition range between the mono-aluminum di-hydrogen having an $Al_2O_3$ to $P_2O_5$ ratio of 1:3, and the di-aluminum mono-hydrogen phosphate having an $Al_2O_3$ to $P_2O_5$ ratio of 2:3 provided the water content is properly controlled.

In these compositions, two types of water are involved, first the chemically combined water which is present as hydrogen and oxygen in the phosphoric acid, and second, the free or uncombined water whose presence develops in the compound the amorphous and water dispersible properties. This free or uncombined water can, however, occur also as water of crystallization in the crystalline type of aluminum hydrogen phosphate, but in this type of compound, the water does not impart to the compound the water dispersible and other desirable properties of the compounds of the present invention.

Depending on water content and composition, the aluminum hydrogen phosphates ranging from mono- to di-aluminum hydrogen phosphate may exist either in liquid or in solid form. The transition from one phase to the other is fairly sharply marked through a narrow zone of rapidly changing viscosity. This is indicated by curve 6 in the drawing. The graph was prepared on the basis of the chemical equivalents for 3 mols $P_2O_5$ or 6 mols $H_3PO_4$. The compound having an $Al_2O_3:P_2O_5$ ratio of 1:3, when practically free of uncombined water, is a somewhat ductile solid at 20° C. while the compound with the 1½:3 ratio is a solid at 20° C. with a content of free water as high as 25 per cent by weight or about 14.5 mols per 4½ mols of solids ($Al_2O_3$ and $P_2O_5$). The compound with the 1¾:3 ratio is solid at 20° C. with a content of uncombined water as high as 33 per cent by weight or about 19 mols per 4¾ mols of solids. The inclined dotted lines 7, 8, 9, 10, 11, 12 indicate the water content of an aluminum hydrogen phosphate when prepared from aluminum tri-hydroxide and phosphoric acid of various concentrations. The free water that enters the product during the reaction of phosphoric acid with aluminum tri-hydroxide or aluminum oxide, comes either from the water of reaction or from the water of dilution of the acid. Both can be adjusted to a certain extent to meet processing and product requirements.

It will be noted in the graph that in the event the aluminum hydrogen phosphate is prepared from aluminum trihydroxide and 100 per cent phosphoric acid, the product will have a water content low enough so that most of the products will be in the solid phase. On the other hand, when an aluminum hydrogen phosphate is made from aluminum tri-hydroxide and phosphoric acid of 75 per cent concentration, it will be noted that all of the products are in the liquid phase. This is due to the relatively high water content which is introduced into the product from the dilution of the phosphoric acid.

As before indicated, the invention resides in the development of a solid form of aluminum hydrogen phosphate having an $Al_2O_3$ to $P_2O_5$ ratio ranging from 1.5:3 to 1.85:3 and which is dispersible in water to produce clear, viscous solutions of highly adhesive quality. This solid form is amorphous, hydrated and has the appearance of a resin-like material. In order to have and retain these desirable properties, the aluminum hydrogen phosphate should have a free or uncombined water content, the upper limit of which is defined by curve 6 and the lower limit of which is defined by curve 5. When heated, it has pronounced thermoplastic characteristics and melts into a viscous mass which releases water. When the loss of water has become appreciable, as in a commercial drying operation at about 250° F., the mass solidifies again. The dehydrated phosphate at 250° F. is not fully inert to water; it will, however, thoroughly cement together and render non-slaking in water a great variety of compositions containing clay and other fillers. It will become essentially inert to water on heating to 500° F. and higher.

The properties of the compounds of this invention have been described to distinguish them from aluminum hydrogen phosphates of a crystalline nature which have no pronounced adhesive qualities, or none at all, and which do not disperse in water to form clear, viscous solutions, but are practically insoluble in water and may be brought into solution only by treatment with mineral acid. Such compounds of crystalline character are mentioned in the chemical literature. The descriptions of these compounds are, in some instances, rather vague, but in most cases definite formulae as for crystalline substances are given for them, including definite quantities of water of crystallization.

The amorphous, aluminum hydrogen phosphates are metastable and, under certain conditions, will devitrify and precipitate the stable crystalline form which is often micro-crystalline. This precipitation from either a solution or the solid material may be induced by prolonged or excessive heating at atmospheric pressure, but especially also by higher pressures in an autoclave, further by the presence of crystallization centers. In some instances, the presence of certain substances in the compound will cause an increased tendency towards devitrification. This is especially true, for instance, with aluminum sulphate, which must not be combined with the aluminum phosphates in one compound if good storage qualities are desired.

When proper conditions of production, packaging and the normal conditions of commercial storage are observed, the solid aluminum hydrogen phosphates may be kept for years without deterioration.

Aluminum hydrogen phosphates of this invention are useful in the manufacture of clay products, ceramic articles of various kinds and in other lines of manufacture. These phosphates are used as inorganic adhesives in combination with clays and non-plastic ingredients of inorganic and organic composition. By mixing the powdered solid aluminum hydrogen phosphate in suitable ratio with these ingredients, new and useful compositions are produced. Refractory ramming mixes or mortars, for instance, can be packaged in dry form and plasticized with water by the consumer at the place of use.

For purposes of this kind, it is necessary to develop certain exacting properties which meet demands for convenience and reliability. In addition to the properties previously explained, the following additional properties must be incorporated: good dispersibility, hardness and grindability, also low hygroscopicity that will not change the solid material into a liquid.

The changes that take place in the hygroscopic properties are shown in the Figure. A number of compositions were prepared from 85 per cent phosphoric acid and aluminum trihydrate. These substances were then placed into constant humidity air baths and the weight changes observed until equilibrium was obtained. After 48 hours, the weight changes became small and in most cases, there was little further change after 240 hours and a further 2 months, with the exception of the sample over $P_2O_5$ which kept losing slight quantities of water over the whole period, but became essentially stabilized at content of free water of approximately 8 mols.

Curve 1 shows the equilibrium conditions over concentrated ammonium chloride solution at 20° C. at a relative humidity of 78 per cent, 2 over sodium dichromate and a relative humidity of 52, 3 over potassium carbonate and a relative humidity of 43%. The respective curves intersect the solid-liquid curve 6 and the average of the intersecting range is at the region where the $Al_2O_3:P_2O_5$ ratio of the composition is about 1⅜:3. This would mean that with a humidity of only about 40 per cent in the atmosphere, it would not be practical to use an aluminum hydrogen phosphate with an $Al_2O_3:P_2O_5$ ratio of less than 1⅜:3 without risking liquefying on exposure to the atmosphere. In many parts of this country, during certain periods of the year, the average humidity is nearer the upper limit which means that for practical purposes, the $Al_2O_3:P_2O_5$ ratio of aluminum hydrogen phosphate should not be below 1.5:3.

Tests have shown that the presence of sulphate in a relatively non-hygroscopic acid aluminum phosphate will produce increased hygroscopic properties. The hygroscopicity is very well developed when the mol ratio of aluminum sulphate and aluminum hydrogen phosphate becomes approximately 1:1.

Compositions of low hygroscopicity are found in the aluminum hydrogen phosphates having an $Al_2O_3:P_2O_5$ ratio of 1.5:3 and above. For the production of these compositions, commercial 85 per cent phosphoric acid $H_3PO_4$ is a suitable raw material. As can be seen in the drawing, solid compositions having an $Al_2O_3:P_2O_5$ ratio between 1.5:3 and 2:3 can be made from this acid. The inclined dotted lines 7, 8, 9, 10, 11, 12 show the theoretical compositions from 75, 80, 85, 90, 95 and 100% $H_3PO_4$. The line for 85 per cent acid intersects the solid-liquid curve 6 practically at the region of composition of 1½:3 ratio. Usually, however, there is a certain evaporation of water from the batch during processing, which accounts for a lower water content by about one mol in the finished product, as indicated by line 4.

The concentration of the acid employed can be 85, 90, 95 or even 100 per cent without loss of water dispersibility of the resulting composition. The quantity of water which is formed as water of reaction is an important ingredient in the product. The viscosity in these concentrated compositions becomes very high and they require a slow moving, heavy duty mixer for processing, for instance, a mixer fitted with sigma type blades was successfully used. During this mixing, the viscosity must be kept as low as possible and the temperature of the batch must not be allowed to drop below 100° C. The more free water can be allowed in the products, the lower is its viscosity and easier can standard equipment be adapted to their production. Unless special conditions require a composition of very low water content, the preferred concentration of acid is between 85 and 95 per cent.

The production of solid water dispersible aluminum hydrogen phosphates from these acids is accomplished by a method involving two steps. These two steps are required by the large difference in chemical reactivity of the first and the second hydrogen of the phosphoric acid $H_3PO_4$ for purposes of proper control of the production process.

In this method, the first step consists in reacting aluminum tri-hydroxide or alumina with phosphoric acid to produce aluminum hydrogen phosphate having an $Al_2O_3:P_2O_5$ ratio of 1:3. This composition has a relatively low viscosity and during its formation, most of the heat of reaction is developed. In the second step in which further aluminum tri-hydroxide or alumina is added to the product of the first step and during the reaction of the second hydrogen, in this second step, relatively little heat is developed, but the viscosity of the phosphate increases very rapidly. This is illustrated by the liquid-solid boundary curve 6 in the drawing. When the composition change along line 4 is followed from the 1:3 ratio to beyond the 1½:3 ratio, it intersects an area of desirable compositions. These form a heavy dough at about 100° C., but develop the characteristic glass-like property of an amorphous solid when cooled to room temperature.

The first step, the formation of the composition of 1:3 ratio, is carried out in a kettle with standard facilities for agitation. A measured quantity of 85 per cent phosphoric acid is heated in the kettle to about 150 F. and a necessary quantity of aluminum tri-hydrate is introduced in a steady stream. This aluminum tri-hydrate is relatively coarse or of approximately minus 200 mesh grain size. The reaction causes the temperature to rise to boiling. A certain amount of water is evaporated corresponding to approximately 1 mol. Line 4 in the figure is, therefore, not on the line for the theoretical composition for 85 per cent acid but below it. This result is quite desirable as the lower water content improves the brittleness and the grindability of the product.

After the initial force of the reaction is spent and the composition of 1:3 ratio is formed, a further quantity of aluminum tri-hydroxide is added. This second reaction is carried out in a heavy duty mechanical mixer, such as a Baker-Perkins sigma mixer. The liquid composition of 1:3 ratio is placed in the mixer while still hot and the necessary quantity of a very finely divided aluminum tri-hydrate is added. The particle size of this very finely divided aluminum tri-hydrate is approximately 1 micron. This very finely divided material is used in the second stage to facilitate dissolving in the 1:3 ratio product. A coarser material will react with great sluggishness. A certain amount of heat is produced during this second stage, and it is preferable to start at a lower temperature than the boiling temperature, for instance, in the vicinity of 150° F. This prevents a too rapid reaction of the finely divided aluminum tri-hydrate and is a means of extending the mixing time. Under these conditions of operation, the mixing time is about 3 to 5 minutes, at which point, dispersion is satisfactory. The reaction is not necessarily complete, however, the material can be discharged from the mixer before maximum viscosity is reached and left to cool. During cooling, the reaction becomes completed. Rapid cooling in thin layers of not more than 2 inches is preferred.

The hard glassy material is then crushed in a hammer mill to a fine powder. This will compact again under its own weight into a solid lump unless a parting material is added. If the phosphate is intended for a ceramic purpose and if clay is an ingredient of the ceramic mix, then about 20 per cent of a high grade kaolin may be added to the powdered phosphate for parting. Other parting materials, such as finely divided aluminum tri-hydroxide and the like can also be used.

A certain obvious modification of the water content can be accomplished by the use of calcined aluminum tri-hydrate. The water of reaction is then reduced to one half of the regular amount. If the calcination is carried out at low temperature and not higher than about 1400° F., then the reactivity is not impaired very greatly and processing with calcined aluminum tri-hydroxide follows essentially the procedure previously outlined.

By drying over phosphorus pentoxide, the content of free or uncombined water was lowered to about 8 mols. as shown by line 5 in the drawing. Although feasible of accomplishment, this water content being below that for the 100 per cent acid, could not very readily be produced by the two-stage process herein outlined, except with a subsequent step of drying. The lower commercially practical limit of free or uncombined water can, therefore, be regarded as coinciding with line 7 or the products of 100 per cent phosphoric acid. The preferred range for most commercial purposes is located between 85 and 95 per cent acid as indicated by lines 8 and 9.

The sesqui-aluminum hydrogen phosphate ($Al_2O_3:P_2O_5 = 1\frac{1}{2}:3$) was shown previously as the composition of lowest alumina content that meets the specifications for low hygroscopicity.

The reactivity of the 1 micron alumina tri-hydroxide in the vicinity of the 2:3 ratio composition becomes very low, and the highest alumina content that can be introduced through the above processing method is for practical purposes about 1.85 mols of alumina for 3 mols of phosphorus pentoxide. In normal commercial production, the $Al_2O_3:P_2O_5$ ratio of the composition is kept usually between 1.6:3 and 1.75:3. The material in this range is very readily grindable in a hammer mill; it is hard and brittle, distinctly amorphous and glassy. It will grind readily even in hot summer weather, and the powder disperses well in water.

The aluminum hydrogen phosphates of this invention may be modified by the addition of proteins, such as for instance, gelatine or animal glue. The animal glue is dissolved in the phosphoric acid and this solution is used in the two-stage process as has been described. A content of 10 per cent of animal glue, for instance, was found to be a very effective stabilizer of the aluminum hydrogen phosphate against devitrification.

These solid aluminum hydrogen phosphate compositions can be dispersed in water. They first soak up water and then disperse.

The tendency of the pure aluminum phosphates to hydrolyze increases with increasing content of alumina. When hydrolysis occurs, the precipitate is redissolved after the pH of the solution reaches a value below 2½. Hydrolysis can be prevented, therefore, by keeping the pH low through addition of a readily soluble, solid acid such as oxalic acid to the powder, provided sufficient parting is supplied by inert ingredients, such as, clay or aluminum hydrate, etc. The same effect, as with oxalic acid, can be accomplished with aluminum sulphate or chloride. It was explained before that the sulphate has a detrimental effect on the stability by causing devitrification and by causing an increase in hygroscopic properties. However, when these two compounds are kept separated in a dry powdered mix, the effect of the sulphate is beneficial.

The separation is especially effective in dry ceramic mixes such as ramming mixes, mortars and the like where the ceramic ingredients contribute materially to parting.

For a more detailed description of the process by way of example, two series of compositions are chosen, one was prepared from 85 per cent commercial phosphoric acid and the other from a 95 per cent grade of phosphoric acid. These examples are given in tabulated form in the two tables which follow:

TABLE I

[From 85% $H_3PO_4$]

INPUT

| $Al_2O_3:P_2O_5$ Ratio | 1.5:3 | 1.65:3 | 1.75:3 | 1.85:3 |
|---|---|---|---|---|
| | Pts. by wt. | Pts. by wt. | Pts./wt. | Pts./wt. |
| 85% $H_3PO_4$ | 692.0 | 692.0 | 692.0 | 692.0 |
| $Al(OH)_3$—200 mesh | 156.0 | 156.0 | 156.0 | 156.0 |
| $Al(OH)_3$—1 micron | 78.0 | 100.6 | 117.0 | 132.5 |
| Total | 926.0 | 948.6 | 965.0 | 980.5 |

PRODUCT

| | Pts./wt. | Per Cent | Pts./wt. | Per Cent | Pts./wt. | Per Cent | Pts./wt. | Per Cent |
|---|---|---|---|---|---|---|---|---|
| $Al_2O_3$ | 153.0 | 16.9 | 168.3 | 18.1 | 178.5 | 18.9 | 188.8 | 19.25 |
| $P_2O_5$ | 426.0 | 47.2 | 426.0 | 45.8 | 426.0 | 45.1 | 426.0 | 43.41 |
| $H_2O$ Combined | 81.0 | 8.9 | 72.9 | 7.9 | 67.5 | 7.1 | 62.1 | 6.33 |
| $H_2O$ Free | 244.0 | 27.0 | 262.0 | 28.2 | 272.5 | 28.9 | 283.0 | 31.01 |
| Total | 904.0 | 100.0 | 929.2 | 100.0 | 944.5 | 100.0 | 959.9 | 100.00 |
| $H_2O$ Lost | 22.0 | | 19.4 | | 20.5 | | 20.6 | |

TABLE II

[From 95% $H_3PO_4$]

INPUT

| $Al_2O_3:P_2O_5$ Ratio | 1.5:3 | 1.65:3 | 1.75:3 | 1.85:3 |
|---|---|---|---|---|
| | Pts./wt. | Pts./wt. | Pts./wt. | Pts./wt. |
| 95% $H_3PO_4$ | 618.0 | 618.0 | 618.0 | 618.0 |
| $Al(OH)_3$—200 mesh | 156.0 | 156.0 | 156.0 | 156.0 |
| $Al(OH)$—1 micron | 78.0 | 101.5 | 117.0 | 135.5 |
| Total | 852.0 | 875.5 | 891.0 | 906.5 |

PRODUCT

| | Pts./wt. | Per Cent | Pts./wt. | Per Cent | Pts./wt. | Per Cent | Pts./wt. | Per Cent |
|---|---|---|---|---|---|---|---|---|
| $Al_2O_3$ | 153.0 | 18.3 | 168.3 | 19.6 | 179.0 | 20.4 | 188.8 | 21.2 |
| $P_2O_5$ | 426.0 | 51.0 | 426.0 | 49.5 | 426.0 | 48.5 | 426.0 | 47.8 |
| $H_2O$ Combined | 81.0 | 9.7 | 72.9 | 8.5 | 67.0 | 7.6 | 62.1 | 7.0 |
| $H_2O$ Free | 176.0 | 21.0 | 192.5 | 22.4 | 207.0 | 23.5 | 214.0 | 24.0 |
| Total | 836.0 | 100.0 | 859.7 | 100.0 | 879.0 | 100.0 | 890.9 | 100.0 |
| $H_2O$ Lost | 16.0 | | 15.8 | | 12.0 | | 15.6 | |

Referring to Table I, it will be noted that an aluminum hydrogen phosphate having an $$Al_2O_3:P_2O_5$$

ratio of 1.65:3 was prepared from 85% phosphoric acid and aluminum tri-hydroxide by mixing and reacting the following:

*Input*

| | Parts by weight |
|---|---|
| 6 mols of 85% $H_3PO_4$ | 692 |
| 1 mol $Al_2O_3 \cdot 3H_2O$ —200 mesh | 156 |
| 0.65 mols $Al_2O_3 \cdot 3H_2O$ —1 micron | 100.6 |
| | 948.6 |

It will be noted that the product obtained was:

Product

| | Parts by weight | Percent |
|---|---|---|
| $Al_2O_3$ | 168.3 | 18.1 |
| $P_2O_5$ | 426.0 | 45.8 |
| $H_2O$, combined | 72.9 | 7.9 |
| $H_2O$, uncombined | 262.0 | 28.2 |
| | 929.2 | 100.0 |
| $H_2O$, lost | 19.4 | |

Other compositions are equally well shown in the tables.

All of the compositions falling within the concept of this invention are clearly diagrammatically indicated on the chart or graph in the drawing, which is drawn to scale and accurately represents the values disclosed. Referring to the chart or graph, the compounds of this invention having the desired properties set forth herein are broadly those having an $Al_2O_3:P_2O_5$ ratio ranging from 1.5:3 to 1.85:3 and having a maximum total of combined and uncombined water content ranging from about 19 mols per 4.5 mols of solids for the composition having 1.5:3 ratio to about 23 mols per 4.85 mols of solids for the composition having 1.85:3 ratio, and having a minimum total of combined and uncombined water content ranging from about 13 mols per 4.5 mols of solids for the composition having the 1.5:3 ratio to about 11.5 mols per 4.85 mols of solids for the composition having the 1.85:3 ratio. Since the combined water at the 1.5:3 ratio is about 4.5 mols and at the 1.85:3 ratio is about 3.5 mols, the mols of free water can be easily determined. The lower limit of water content just stated will not detrimentally affect the desired properties, but a water content much below that stated will decrease the water dispersible properties of the compounds.

The lower limit of the $Al_2O_3:P_2O_5$ ratio is that at which compounds having the desired properties will maintain those properties at room temperature and atmospheric humidity conditions. The upper limit of the $Al_2O_3:P_2O_5$ ratio is that of practical preparation.

In commercial practice, it has been found desirable to prepare compounds having an $Al_2O_3:P_2O_5$ ratio between 1.6:3 and 1.75:3 with an upper water content corresponding to that obtained when preparing said compounds with 85% phosphoric acid or ranging from about 19.5 mols of total water for the 1.6:3 ratio compound to about 20 mols for the 1.75:3 ratio compound. Said compounds should have a lower water content corresponding to that obtained when preparing the compounds with 95% phosphoric acid or ranging from about 15.5 mols total water for the 1.6:3 ratio composition to 16 mols for the 1.75:3 ratio composition.

The products prepared according to the present invention as described and illustrated in the drawing and Tables I and II, and lying within the limits hereinbefore set forth will be solid at room temperatures such as 70°–90° F. and lower. While the temperature of the compositions may be raised above 90° F. during grinding, especially in summer weather, and they may soften somewhat, they still have sufficient hardness and brittleness to enable them to be ground to powder form.

After cooling, the material had a whitish, translucent appearance from entrained air bubbles. Thin splinters were glassy and brittle, and ground well in a hammer mill.

The grinding properties for the 1.5:3 ratio composition from 85 per cent phosphoric acid are fair in normal weather but not as good in warm summer weather. However, with suitable precaution the material can still be used. The grinding properties for the 1.65:3 ratio material are good even in hot summer weather, and the dispersibility also is satisfactory. This is also true of the 1.70:3; 1.75:3 and 1.85:3 ratio compositions. The brittleness of the compounds increases as the content of alumina increases which is accompanied by an improved shattering and grinding in a hammer mill.

While in the foregoing description, reference has been made to the use of an aluminum hydrate of a particle size of about 1 micron in the second step of the process, it is within the scope of the invention to vary this size. The larger the size particle used, the slower the reaction will be.

It will be noted on the graph that the lower limit of uncombined water is about 8 mols for the entire range of compounds.

From the foregoing, it will be appreciated that the present invention provides aluminum hydrogen phosphates solid at room temperatures and below, of amorphous structure, glassy in appearance, brittle, capable of being ground in a hammer mill, essentially non-hygroscopic, thermoplastic and dispersible in water to form a viscous adhesive solution.

Having described my invention, what I claim is:

1. An aluminum hydrogen phosphate having an $Al_2O_3:P_2O_5$ ratio ranging from 1.5:3 to 1.85:3, having a maximum total of combined and uncombined water content ranging from about 19 mols per 4.5 mols of $Al_2O_3$ and $P_2O_5$ for the composition having 1.5:3 ratio to about 23 mols per 4.85 mols of $Al_2O_3$ and $P_2O_5$ for the composition having 1.85:3 ratio, and having a minimum total of combined and uncombined water content ranging from about 13 mols per 4.5 mols of $Al_2O_3$ and $P_2O_5$ for the composition having the 1.5:3 ratio to about 11.5 mols per 4.85 mols of $Al_2O_3$ and $P_2O_5$ for the composition having the 1.85:3 ratio, said aluminum hydrogen phosphate being solid at room temperatures and below, of amorphous structure, dispersible in water to form a viscous adhesive solution, essentially non-hygroscopic, and thermoplastic.

2. An aluminum hydrogen phosphate having an $Al_2O_3:P_2O_5$ ratio ranging from 1.6:3 to 1.75:3, having a maximum total of combined and uncombined water content ranging from about 19.5 mols per 4.6 mols of $Al_2O_3$ and $P_2O_5$ for the composition having 1.6:3 ratio to about 20.2 mols per 4.75 mols of $Al_2O_3$ and $P_2O_5$ for the composition having 1.75:3 ratio, and having a minimum total of combined and uncombined water content ranging from about 15.5 mols per 4.6 mols of $Al_2O_3$ and $P_2O_5$ for the composition having the 1.6:3 ratio to about 16.2 mols per 4.75 mols of $Al_2O_3$ and $P_2O_5$ for the composition having the 1.75:3 ratio, said aluminum hydrogen phosphate being solid at room temperatures and below, of amorphous structure, dispersible in water to form a viscous adhesive solution, essentially non-hygroscopic, and thermoplastic.

3. A method of preparing an amorphous aluminum hydrogen phosphate solid at room temperatures and dispersible in water to form a viscous adhesive solution comprising effecting a reaction between an aluminum compound having a phosphoric acid reactible aluminum oxide component and phosphoric acid in proportions having an $Al_2O_3:P_2O_5$ ratio ranging from 1.5:3 to 1.85:3 and controlling the total of combined and uncombined water content to form an amorphous aluminum hydrogen phosphate solid at room temperatures and dispersible in water to form a viscous adhesive solution having a maximum total of combined and uncombined water content ranging from about 19 mols per 4.5 mols of $Al_2O_3$ and $P_2O_5$ for the composition having 1.5:3 ratio to about 23 mols per 4.85 mols of $Al_2O_3$ and $P_2O_5$ for the composition having 1.85:3 ratio, and having a minimum total of combined and uncombined water content ranging from about 13 mols per 4.5 mols of $Al_2O_3$ and $P_2O_5$ for the composition having the 1.5:3 ratio to about 11.5 mols per 4.85 mols of $Al_2O_3$ and $P_2O_5$ for the composition having the 1.85:3 ratio.

4. A method of preparing an amorphous aluminum hydrogen phosphate solid at room temperatures and dispersible in water to form a viscous adhesive solution comprising effecting a reaction between an aluminum compound having a phosphoric acid reactible aluminum oxide component and phosphoric acid in proportions having an $Al_2O_3:P_2O_5$ ratio ranging from 1.6:3 to 1.75:3 and controlling the total of combined and uncombined water content to form an amorphous aluminum hydrogen phosphate solid at room temperatures and dispersible in water to form a viscous adhesive solution having a maximum total of combined and uncombined water content ranging from about 19.5 mols per 4.6 mols of $Al_2O_3$ and $P_2O_5$ for the composition having 1.6:3 ratio to about 20.2 mols per 4.75 mols of $Al_2O_3$ and $P_2O_5$ for the composition having 1.75:3 ratio, and having a minimum total of combined and uncombined water content ranging from about 15.5 mols per 4.6 mols of $Al_2O_3$ and $P_2O_5$ for the composition having the 1.6:3 ratio to about 16.2 mols per 4.75 mols of $Al_2O_3$ and $P_2O_5$ for the composition having the 1.75:3 ratio.

HERBERT H. GREGER.

REFERENCES CITED

The following references are of record in the file of this patent:

UNITED STATES PATENTS

| Number | Name | Date |
| --- | --- | --- |
| 493,889 | Goodale et al. | Mar. 21, 1893 |
| 2,161,290 | Grimm et al. | June 6, 1939 |
| 2,291,608 | Cobbs et al. | Aug. 4, 1942 |
| 2,460,344 | Greger | Feb. 1, 1949 |

FOREIGN PATENTS

| Number | Country | Date |
| --- | --- | --- |
| 440,400 | Great Britain | Dec. 16, 1935 |

OTHER REFERENCES

Mellor: "Inorganic and Theoretical Chemistry," vol. 5 (1924), pages 362, 363 and 365.

Morfit: "Practical Treatise on Pure Fertilizers," Trubner & Co., London, 1873, pages 360, 361 and 364.